United States Patent Office 3,305,543
Patented Feb. 21, 1967

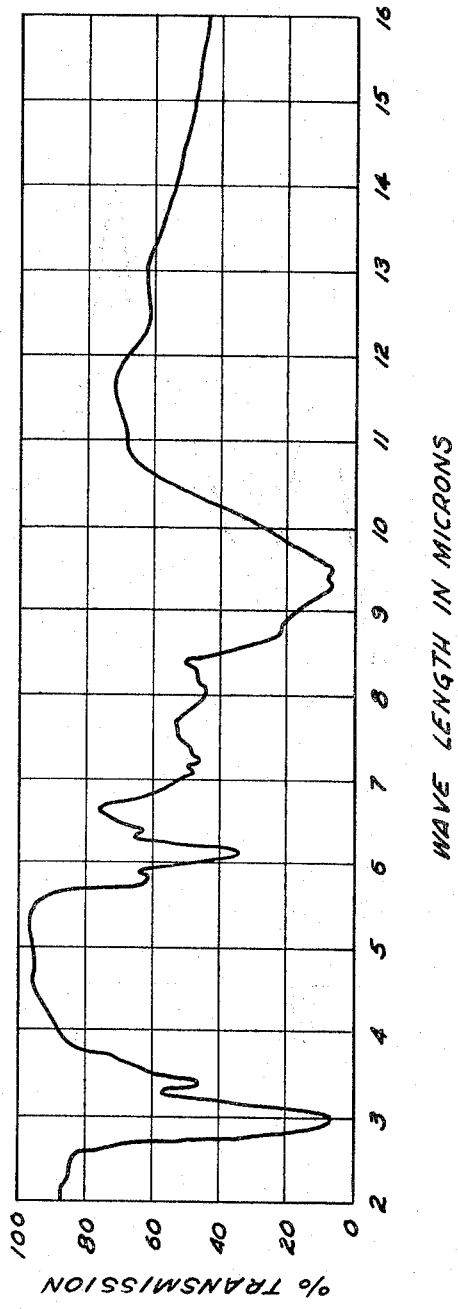

3,305,543
CARRAGLUCAN POLYSACCHARIDE AND
PROCESS FOR ITS PRODUCTION
Theodore H. Haskell, Ann Arbor, Mich., assignor to Parke, Davis & Company, Detroit, Mich., a corporation of Michigan
Filed Aug. 30, 1965, Ser. No. 483,623
8 Claims. (Cl. 260—209)

The present invention relates to a new polysaccharide existing in free acid and salt forms and to a process for its production. More particularly, the invention relates to a new polysaccharide having useful anti-infective properties which has been given the name "carraglucan." The assignment of the name carraglucan is based on the fact that this substance is a glucose-containing polysaccharide produced from carrageenan, the latter material being a polysaccharide complex extracted from certain varieties of seaweed.

The term carraglucan normally refers to the polysaccharide substance of the invention in both free acid and salt forms. In those cases when the distinction between the various forms becomes significant, the term may be modified as for example, "carraglucan free acid" or "carraglucan sodium salt." However, the unmodified term carraglucan embraces both the free acid and simple salt forms. The simple salt forms are the salts with cations which do not contain chromophores or other structural units radically altering the properties of the polysaccharide.

Carraglucan is a water-soluble substance, heat stable and nondialyzable. In purified form it is a white or slightly off-white solid. It is only slightly soluble in common organic solvents such as alcohols, ethers, and hydrocarbons. Its acidic properties in free acid form are attributable to carboxyl and acid sulfate groups. In free acid form preparations of carraglucan contain the elements carbon, hydrogen, oxygen, sulfur, and nitrogen. However, the form of carraglucan most usually encountered is not the free acid form but rather a salt form, as the free acid form predominates only at very low pH values. At a pH of about 7, carraglucan exists almost entirely in salt form and, except where otherwise specifically indicated, the physical properties referred to in this disclosure were determined on the sodium salt. In general, differences in physical properties between the free acid form and the sodium salt form are within the limits of experimental error.

Carraglucan affords upon hydrolysis D-galactose, L-galactose, D-glucose, xylose, a reducing substance and a uronic acid. It is strongly levorotatory, having a specific rotation value $[\alpha]_D^{26} = -47$ to $-65°$ when determined as a 0.3% solution in 0.1 M phosphate buffer at pH 7.0. Carraglucan has a low degree of sulfation and upon analysis shows less than 2% sulfur. The intrinsic viscosity $[\eta]$ is 0.2 to 1.1, determined in 0.1 M phosphate buffer at pH 7.0. The molecular weight is 6000 to 11,000, determined by an end group reducing assay. The procedure used for this molecular weight determination is the alkaline ferricyanide procedure as described in "Methods in Carbohydrate Chemistry," vol. 1, p. 513, Whistler and Wolfrom, Academic Press, 1962. When compared with known polysaccharides derived from carrageenan, carraglucan is distinguished in its physical and chemical properties by its strong levorotation, its low degree of sulfation, and its much lower intrinsic viscosity and molecular weight.

Carraglucan gives a positive anthrone test (green color), a positive phloroglucinol test (pink to yellow color), and a positive carbazole test for uronic acids (purple color). Carraglucan gives negative tests for sialic acid and for simple alkanoic acid esters.

Microanalysis of a purified sample of carraglucan sodium salt showed 40.97% carbon, 6.20% hydrogen, 1.85% nitrogen, 0.84% sulfur, and 3.7% ash. Another purified sample of carraglucan sodium salt showed 41.09% carbon, 6.28% hydrogen, 2.24% nitrogen, 1.01% sulfur, and 3.55% ash. The ash is present as inorganic salts, primarily sodium sulfate and sodium carbonate. Stoichiometrically, about one-third of the weight of ash represents sodium.

Carraglucan has a characteristic infrared absorption spectrum. The drawing shows the infrared absorption spectrum of carraglucan, sodium salt form, in a potassium bromide disk. Infrared absorption maxima appear at about 2.94, 3.40, 5.78, 6.07, 6.43, 7.07, 7.21, 7.41 (shoulder), 8.03, 8.70, 9.26, 9.50, 11.10, and 12.40 microns. Carraglucan has little or no selective absorption in the ultraviolet, being essentially transparent at wave lengths of about 240 to 400 millimicrons.

In accordance with the invention, carraglucan is produced by dissolving carrageenan or a suitable carrageenan fraction in a solution of 0.05 to 1.0 M alkali metal salt and reacting the carrageenan or suitable carrageenan fraction with strong acid at a concentration of 0.05 to 1.0 N. The preferred carrageenan fraction for use as a starting material in the process of the invention is crude λ-carrageenan, although mixtures of crude λ-carrageenan containing varying amounts of κ-carrageenan, as well as unfractionated carrageenan, can also be used. The use of crude λ-carrageenan containing not more than minor amounts of κ-carrageenan is preferred because with such a starting material the reaction product can readily be isolated in relatively pure form. A specific example of such a starting material is crude λ-carrageenan, Marine Colloids, Inc., Lot No. 562,202. Some examples of alkali metal salts suitable for use in the process of the invention are sodium chloride, potassium chloride, sodium bromide, lithium chloride, sodium acetate, lithium bromide, and sodium sulfate. A preferred alkali metal salt solution is 0.1 M sodium chloride. Some examples of strong acids suitable for use in the process of the invention are hydrochloric, sulfuric, hydrobromic, phosphoric, and trichloroacetic acids. A preferred strong acid is hydrochloric acid at a concentration of 0.1 N. The optimal concentration of carrageenan in the solution can be varied over rather wide limits but when using ordinary crude λ-carrageenan as starting material in 0.1 M sodium chloride the preferred carrageenan concentration is 0.55 to 0.70% by weight. The usual time and temperature for the reaction are from 15 minutes to 24 hours at 5 to 40° C., the longer reaction times being used at the lower temperatures. When the reaction mixture contains hydrochloric acid at a concentration of 0.1 N, the preferred conditions are 1 to 2 hours at 20–30° C.

Following the treatment with acid, the reaction product can be isolated and purified by any of a variety of procedures. For example, the reaction mixture is neutralized to pH 6–7 and diluted with an approximately equal volume of a lower alkanol, such as ethanol, added slowly with stirring. A precipitate, consisting essentially of polysaccharides, is collected and discarded leaving the reaction product, carraglucan, in the aqueous solution. The solution is concentrated and dialyzed against distilled or deionized water until it is essentially free of salts and it is then lyophilized to give a solid product consisting of crude carraglucan. The solid is dissolved in water and the mixture is acidified to pH 1.0–1.5 with stirring and then is chilled and filtered. The filtrate containing carraglucan is neutralized, dialyzed and lyophilized as before and the product is recovered as a solid. For further purification this product is redissolved in 0.05 to 1.0 M alkali metal salt containing 0.05–1.0 N strong acid and fractionated on a chromatography column prepared from a suitable cellulose derivative. It is preferred to dissolve the crude carraglucan in 0.1 M sodium chloride containing hydrochloric acid at a concentration of 0.1 N and fractionate it on a chromatography column packed with a reaction product (in chloride form) of cellulose, epichlorohydrin and triethanolamine. A product commercially available under the name Ecteola cellulose, or a similar product, can be used. The effluent obtained with additional quantities of acidified alkali metal salt solution is neutralized, dialyzed and lyophilized to afford purified or partially purified carraglucan. If additional purification is desired, it can be carried out by dissolving the product from the previous chromatography column in approximately neutral phosphate buffer containing sodium chloride and fractionating it on a second chromatography column prepared from a cross-linked dextran polymer. Materials available under the names, Sephadex G-75 and Sephadex G-100, as well as substances of similar properties, as described in British Patent 854,715 and U.S. Patent 3,105,012, can be used. The purified carraglucan is recovered from the column by development and elution with additional quantities of the phosphate buffer solution, followed by dialyzing and lyophilizing the individual fractions to recover the product.

The exact natures of the chemical reactions that occur when carraglucan is produced by acid treatment of carrageenan are not known with certainty. However, the reactions are interpreted as taking place by a partial hydrolysis with depolymerization of a higher molecular weight polysaccharide. It is not known whether contributing reactions, such as inactivation of an inhibitor, also take place. However, the observed effect is that carraglucan, as produced by the process of the invention, exhibits a great increase in biological potency when compared with the materials from which it is produced.

Typical properties of carraglucan sodium salt compared with corresponding properties of $\lambda$-carrageenan are given in the following table.

|  | Carraglucan Sodium Salt | $\lambda$-Carrageenan |
| --- | --- | --- |
| Sulfation | 0.8 to 1.5% S | 10 to 11% S. |
| Specific Rotation | −47 to −65° | +44 to +72°. |
| Molecular Weight | 6,000 to 11,000 | About 400,000. |
| Intrinsic Viscosity | 0.2 to 1.1 | About 6.7. |

The values indicated for $\lambda$-carrageenan in the above table are intended to be representative of a larger number of reported values and are presented for the purpose of permitting a qualitative rather than a strictly quantitative comparison between carraglucan and $\lambda$-carrageenan.

The present invention comprehends carraglucan and its production in both purified and unpurified states as well as in free acid and in salt forms. Carraglucan free acid forms salts with any of a variety of bases such as sodium hydroxide, sodium carbonate, potassium bicarbonate, ammonia, other inorganic bases, and amines. Preferred salt forms are the alkali metal salts and especially the sodium salt. The free acid or particular salt species of carraglucan present in any chemical or biological system is dependent on the pH and on the cations present in the system and thus the free acid and salt forms of carraglucan are essentially equivalent for the purposes of the invention.

Carraglucan can be employed in free acid or in salt form as a pharmacological agent having anti-infective properties and additionally can be used as an agent in research studies designed to investigate the responses of a biological system to an infective agent. Carraglucan has the property of enhancing host resistance, in a nonspecific manner, to infection with any of a variety of bacteria. This property of acting as a stimulant of nonspecific immune response is not exhibited to a comparable degree by $\lambda$-carrageenan. Carraglucan does not exhibit a significant antibacterial effect in vitro and does not produce an immediate effect in vivo but produces an anti-infective response within a period of a few days following its administration.

The anti-infective properties of carraglucan can be demonstrated by the following procedure. This procedure also serves as a standard assay method for determining the potency of any particular purified or unpurified preparation of carraglucan.

Groups of mice are given a single subcutaneous dose of varying amounts of a carraglucan preparation in aqueous medium. Four days later all mice as well as untreated controls are challenged with 10 to 50 times the $LD_{50}$ (mean lethal dose) of *Klebsiella pneumoniae* given intraperitoneally. Normally 75 to 100% of untreated control mice die following this challenge. The strain of *Klebsiella pneumoniae* used is either the well-known AD strain or a strain having infective properties similarly capable of killing 75 to 100% of the untreated controls. Counts of survivors are made 7 to 10 days after challenge and the percent of survivors are plotted at each dosage level to determine the $PD_{50}$ (mean protective dose). This dose is expressed as milligrams of carraglucan per kilogram of body weight and is the dose capable of protecting approximately 50% of the animals. A low $PD_{50}$ value corresponds to a carraglucan preparation of high potency. Purified carraglucan preparations of maximum potency exhibit $PD_{50}$ values of less than 0.01 mg./kg.

In this specification the symbols $\alpha$, $\eta$, $\kappa$, and $\lambda$ respectively represent the Greek letters alpha, eta, kappa, and lambda.

The invention is illustrated by the following example.

*Example*

A solution is prepared by dissolving 50 g. of crude $\lambda$-carrageenan in 8 liters of boiling 0.1 M sodium chloride. The solution is cooled and 65 ml. of concentrated hydrochloric acid is added to make the hydrogen ion concentration about 0.1 N. The acidified mixture is maintained at 20° C. for 1½ hours, then neutralized to pH 6–7 with 6 N sodium hydroxide and diluted with 8 liters of absolute ethanol, added slowly with efficient stirring. The mixture is stirred for 15 more minutes and allowed to stand for 2½ hours. The clear supernatant solution is separated by decantation, concentrated at reduced pressure to 1/10 of its previous volume, and then dialyzed against deionized water until it is essentially salt-free. The resulting solution is lyophilized to give a solid product consisting of crude carraglucan.

A mixture is prepared by stirring 5 g. of this solid product with 100 ml. of water. It is acidified to pH 1.3 with 6 N hydrochloric acid, cooled in ice, and filtered. The filtrate is neutralized with solid sodium bicarbonate and the resulting solution is dialyzed against deionized water and then lyophilized to give a solid product consisting of recovered carraglucan.

This solid product is fractionated on a chromatography column prepared from the reaction product of cellulose, epichlorohydrin, and triethanolamine. A product available under the name Ecteola cellulose, or a similar product, can be used. The fractionation procedure is as follows. 50 grams of the cellulose product is conditioned for use by washing successively with 0.5 M sodium chloride, 0.5 N sodium hydroxide, 3 M sodium chloride, and finally 0.1 M sodium chloride in 0.1 N hydrochloric acid. The cellulose product is then poured onto a column measuring 3 x 43 cm. and washed with an additional quantity of 0.1 M sodium chloride in 0.1 N hydrochloric acid. The solid product obtained from the last lyophilization, as described above, is dissolved in 170 ml. of 0.1 M sodium chloride in 0.1 N hydrochloric acid. The solution is filtered and passed through the column prepared from the cellulose derivative. The column is eluted with additional quantities of 0.1 M sodium chloride in 0.1 N hydrochloric acid. In a typical fractionation, the first 140 ml. of eluate is discarded and the next 420 ml. of eluate is collected for recovery of the product. This eluate, when collected, is neutralized with solid sodium bicarbonate and the resulting solution is dialyzed against deionized water and lyophilized to give a solid product consisting of partially purified carraglucan.

For further purification, the product thus obtained is fractionated on a chromatography column prepared from a cross-linked dextran polymer. Materials available under the names Sephadex G–75 or Sephadex G–100, as well as substances of similar properties, can be used. For example, a column is prepared containing 45 g. of a cross-linked dextran polymer (Sephadex G–75) and washed with distilled water until it is salt-free. A solution is prepared by dissolving 440 mg. of partially purified carraglucan (obtained by fractionation on the cellulose derivative as described above) in 50 ml. of 0.05 M phosphate buffer containing 0.05 M sodium chloride at pH 7.3. This solution is filtered and poured onto the column prepared from the cross-linked dextran polymer. The column is eluted with additional quantities of the phosphate buffer solution. In a typical fractionation, the first 155 ml. of eluate is discarded and subsequent 50 ml. portions of eluate are collected separately. These fractions are individually dialyzed against deionized water and lyophilized to give polysaccharide fractions having the following physical and biological properties.

| Fraction No. | $[\alpha]_D^{26}$ | $[\eta]$ | Molecular Weight | $PD_{50}$, mg./kg. |
|---|---|---|---|---|
| 1 | −64.5° | 1.10 | 9,000–11,000 | 0.06 |
| 2 | −59° | 0.53 | 7,000–10,000 | 0.009 |
| 3 | −47° | 0.18 | 5,000–7,000 | 0.17 |
| 4 | −43° | 0.10 | 4,000–6,000 | >0.4 |
| 5 | −34° | 0.09 | 4,000–5,000 | >0.4 |
| 6 | −32° | 0.08 | 4,000–5,000 | >0.4 |

In the above table $[\alpha]_D^{26}$ represents the specific rotation determined as a 0.3% solution in 0.1 M phosphate buffer at pH 7.0. The term $[\eta]$ represents the intrinsic viscosity in units of 100 ml./g. determined in 0.1 M phosphate buffer at pH 7.0. The molecular weight values are determined by an end group reducing assay (alkaline ferricyanide procedure). The $PD_{50}$ is the dose required to protect 50% of mice against challenge with *Klebsiella pneumoniae* under standard test conditions.

The product isolated as above from Fractions 1, 2, and in part from 3, is carraglucan having characteristic values for specific rotation, intrinsic viscosity, and molecular weight, as well as high anti-infective potency. The products isolated from Fractions 4, 5, and 6 are other polysaccharide fractions having lower levorotation, lower intrinsic viscosities, slightly lower molecular weights, and only a low degree of anti-infective potency.

I claim:
1. A polysaccharide, carraglucan, existing in free acid and in salt forms, said polysaccharide being a substance which: is water-soluble, heat stable and non-dialyzable; in purified form is a white or slightly off-white solid; is only slightly soluble in common organic solvents; in free acid form contains the elements carbon, hydrogen, oxygen, sulfur, and nitrogen; affords upon hydrolysis D-galactose, L-galactose, D-glucose, xylose, a reducing substance, and a uronic acid; has a specific rotation value $[\alpha]_D^{26} = -47$ to $-65°$ when determined as a 0.3% solution in 0.1 M phosphate buffer at pH 7.0; has a low degree of sulfation and upon analysis shows less than 2% sulfur; has an intrinsic viscosity of 0.2 to 1.1 determined in 0.1 M phosphate buffer at pH 7.0; has a molecular weight of 6000 to 11,000 determined by an end group reducing assay; gives a positive anthrone test, a positive phloroglucinol test, a positive carbazole test for uronic acids, a negative test for sialic acid, and a negative test for simple alkanoic acid esters; upon microanalysis in sodium salt form gives experimentally determined values of 40.97% carbon, 6.20% hydrogen, 1.85% nitrogen, 0.84% sulfur, and 3.7% ash; exhibits substantially no selective ultraviolet absorption; and exhibits a characteristic infrared absorption spectrum in sodium salt form in a potassium bromide disk substantially as shown in the drawing.

2. Process for the production of carraglucan which comprises dissolving carrageenan in a solution of 0.05 to 1.0 M alkali metal salt and reacting with strong acid at a concentration of 0.05 to 1.0 N.

3. Process according to claim 2 wherein the carrageenan is crude λ-carrageenan.

4. Process according to claim 2 wherein the alkali metal salt solution is 0.1 M sodium chloride.

5. Process according to claim 2 wherein the strong acid is 0.1 N hydrochloric acid.

6. Process according to claim 2 wherein the reaction with strong acid is carried out for from 15 minutes to 24 hours at 5 to 40° C.

7. Process according to claim 2 wherein the reaction product is subjected to a subsequent purification operation by fractionating it on a chromatography column prepared with a reaction product of cellulose, epichlorohydrin and triethanolamine.

8. Process according to claim 2 wherein the reaction product is subjected to a subsequent purification operation by fractionating it on a chromatography column prepared with a cross-linked dextran polymer.

No references cited.

JAMES O. THOMAS, JR., *Acting Primary Examiner.*